United States Patent [19]
Ausnit

[11] 4,101,355
[45] Jul. 18, 1978

[54] METHOD OF AND MEANS FOR MAKING VARIABLE WIDTH ZIPPER PROFILE FILM

[76] Inventor: Steven Ausnit, 124 E. 61st St., New York, N.Y. 10021

[21] Appl. No.: 761,670

[22] Filed: Jan. 21, 1977

[51] Int. Cl.² .................................................. B29C 27/00
[52] U.S. Cl. .................................. 156/66; 156/244.27; 156/500
[58] Field of Search ................ 29/408, 33.2, 766, 768; 156/66

[56] References Cited
U.S. PATENT DOCUMENTS

| | | | |
|---|---|---|---|
| 3,627,600 | 12/1971 | Reiter | 156/66 |
| 3,853,671 | 12/1974 | Ausnit | 156/66 |

Primary Examiner—Milton S. Mehr
Attorney, Agent, or Firm—Hill, Gross, Simpson, Van Santen, Steadman, Chiara & Simpson

[57] ABSTRACT

One or more prefabricated extruded reclosable plastic profile strips travelling in the same direction and at the same speed as a prefabricated continuously travelling film web are guided into covergence with the web, transversely adjusted as to position on the web while the web and the fastener strips are travelling without interruption, and then the travelling fastener strips are permanently secured to the travelling web. The adjustability feature is especially useful to facilitate making of various sizes of bags from the zipper profile film web.

28 Claims, 6 Drawing Figures

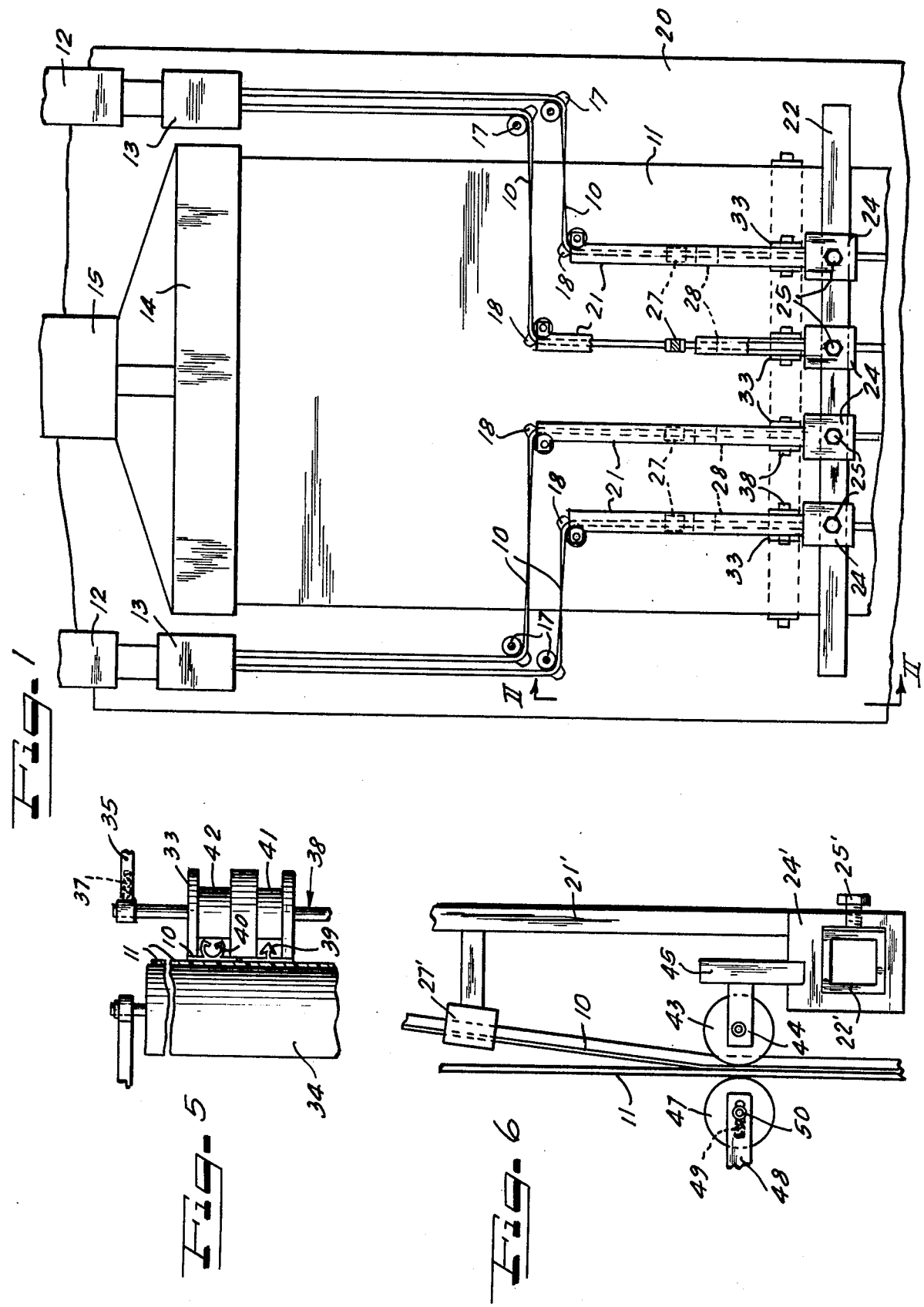

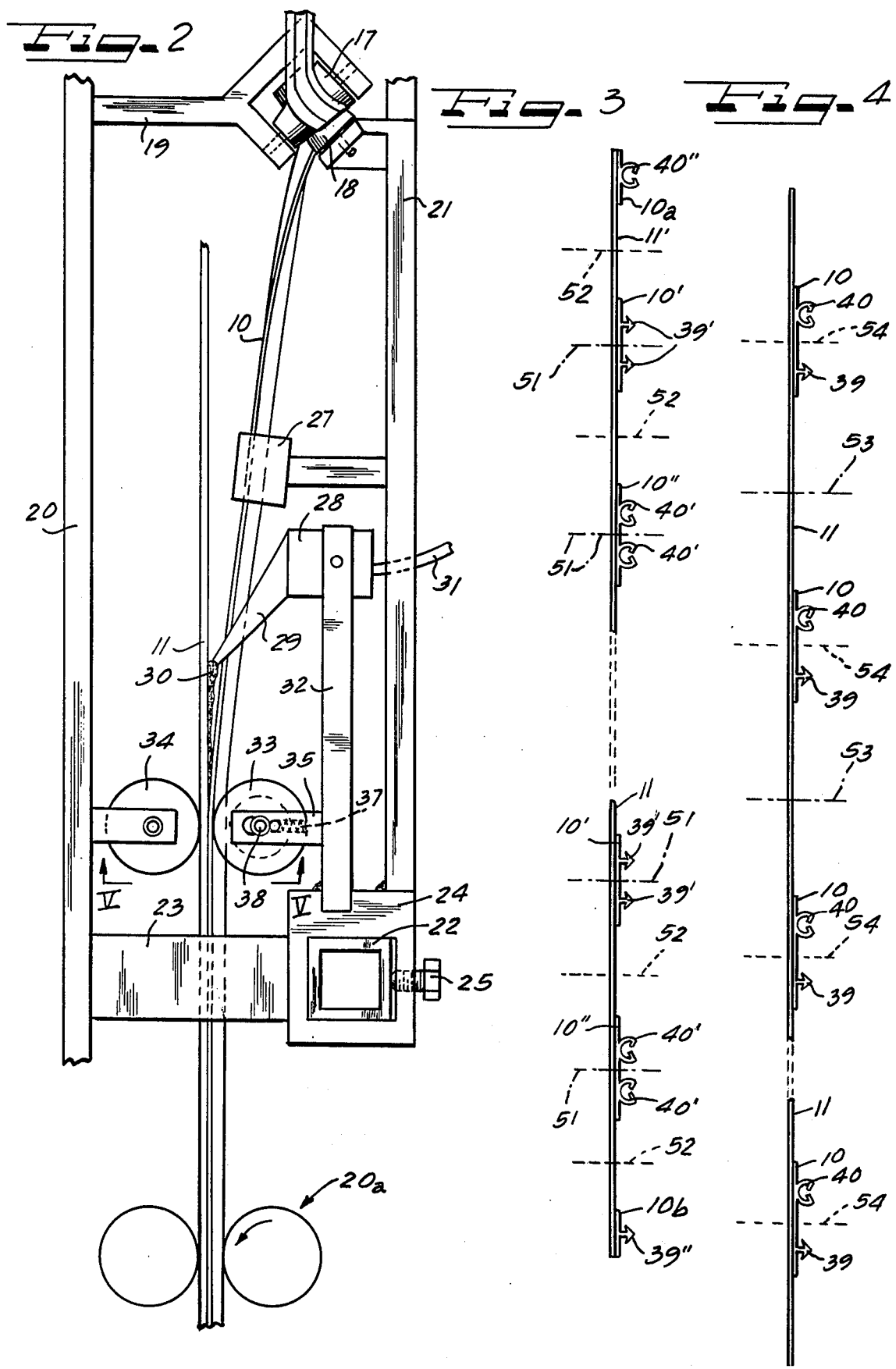

METHOD OF AND MEANS FOR MAKING VARIABLE WIDTH ZIPPER PROFILE FILM

This invention relates to a new and improved method of and means for making variable width zipper profile film of the type which is especially useful in making so-called zipper bags or other articles provided with resilient, profiled reclosable flexible fasteners and wherein the fasteners are closed or opened by elastic deformation.

For various purposes, and especially for the manufacture of bags, mating profiled resiliently flexible extruded plastic fastener strips are joined to film web which may be extruded plastic material. The fasteners may be of the type which can be joined to provide a closure by finger pressure or by means of a slider. The profiles of the fasteners are elastically deformable for this purpose.

Bags made from such material, which may be identified as zipper profile film web, comprise thin film web walls joined along opposite sides to form a U shaped bag body wherein either opposite end of the bag may be initially open or openable and the remaining end closed. For example, the bottom of the bag may remain open until the bag has been filled with a contents such as merchandise and then sealed shut. On the other hand, the upper or top end of the bag may remain open or be readily openable to be filled with the contents. Separable profiled fasteners, generally along the top of the bag, permit opening and closing of the bag for access to the contents and for reclosing the bag as desired. Bags of this general type have been widely used for packaging, especially in the retail trades for purveying consumer products such as food, clothing, tools, etc. Visual inspection of the contents is facilitated by having the bag walls formed from a transparent plastic film web material.

According to prior methods of manufacture, the plastic film web and fastener strips have been formed in a common extrusion operation and generally from the same plastic material. This is a relatively slow process and presents some difficulties resulting from the great difference in mass of the film and the mass of the fastener strips at the location these are coextruded. To alleviate this difficulty, it has been proposed to prefabricate the fastener strips and the film web and then join the same either by electronic fusion or adhesively.

However, according to prior arrangements, variations in the width of the zipper profile film web has required shutting down the production apparatus to effect adjustments as to width, that is, as to the positioning of the fastener strips relative to one another on the film web, and comprising changes in extrusion dies, changes in the mechanisms for bringing the fastener strips and the film web together, while the apparatus remains idle until any changes have been made. That has been especially wasteful procedure where only relatively short runs of the zipper profile film web of any particular widths have been needed.

Therefore, it is an important object of the present invention to overcome the disadvantages, deficiencies, inefficiencies, shortcomings and problems inherent in prior methods and apparatus and to provide a new and improved method of and means for making variable widths of zipper profile film according to which the width of the zipper profile film web can be expeditiously varied without interrupting continuous production.

Another object is to provide a new and improved method of joining extruded plastic fastener strips to extruded plastic film web.

A further object of the invention is to provide new and improved apparatus for joining extruded plastic fastener strips to extruded plastic film web.

Still another object of the invention is to provide a new and improved method of and means for making variable width zipper profiled film web and enabling changing the positions of the fastener strips on the film web as desired without interrupting continuous high speed production.

According to features of the invention there is provided a method of joining a substantially continuous prefabricated resiliently flexible extruded profiled plastic fastener strip to a prefabricated substantially continuous film web which comprises effecting travel of the web and the fastener strip in the same longitudinal direction and at the same speed, guiding the fastener strip into convergence with the web, adjusting the position of the fastener transversely relative to the web while the web and the fastener strip are travelling without interruption, and then permanently securing the travelling fastener strip to the travelling web. Additionally, a plurality of such fastener strips can be adapted for joining to the web in the same fashion at transversely spaced positions on the web, with adjustments being effected in the positions of the strips relative to one another and to the web without interrupting the continuous production running or travel of the web and the strips.

According to other features of the invention, there is provided a new and improved method of extruding a plurality of separate plastic reclosable fastener strips in close proximity to one another and at the same production speed, guiding the fastener strips into spaced joining positions on a web travelling at the same speed as the fastener strips, and securing the strips to the web.

According to further features of the invention there is provided apparatus for extruding plastic fastener strips in close proximity to one another, means for guiding the continuously travelling stips into substantially spaced positions on a web running in the same direction and the same speed as the fastener strips, and means for attaching the fastener strips permanently to the web.

According to still other features of the invention, there is provided apparatus for joining a substantially continuous prefabricated resiliently flexible extruded profiled plastic fastener strip to a prefabricated substantially continuous film web travelling at the same speed as the fastener strip, comprising means for guiding the fastener strip into convergence with the web, means for adjusting the position of the fastener strip transversely relative to the web while the web and the fastener strip are travelling without interruption, and means for permanently securing the travelling fastener strip to the travelling web. Additionally, the guiding means are adapted to guide a plurality of continuously travelling fastener strips convergently into respective transversely spaced positions on the web, and the adjusting means enable adjusting the positions of the fastener strips transversely relative to one another and to the web without interrupting continuous travelling of the fastener strips and the web.

Other objects, features and advantages of the invention will be readily apparent from the following description of a representative embodiment thereof, taken in conjunction with the accompanying drawings although variations and modifications may be effected without departing from the spirit and scope of the novel concepts embodied in the disclosure and in which:

FIG. 1 is a schematic elevational view of means for practicing the invention.

FIG. 2 is an enlarged fragmentary side elevational view taken substantially in the plane of line II—II of FIG. 1.

FIG. 3 is a schematic edge view of a film web equipped with fastener strips according to the present invention and adapted for making open top bags.

FIG. 4 is a schematic edge view of a film web equipped with fastener strips according to the present invention adapted for making bottom open bags.

FIG. 5 is a fragmentary sectional elevational view taken substantially along the line V—V of FIG. 2; and FIG. 6 is a fragmentary side elevational view similar to FIG. 2 but showing a modification.

On reference to FIG. 1, at least one, and in this instance a plurality such as four continuous profiled resiliently flexible extruded plastic fastener strips 10 and a continuous film web 11 which may also be formed from extruded plastic material are caused to travel in the same longitudinal direction and at the same speed. The fastener strips 10 are adjusted as to position relative to the width of the web and to each other and guided into convergence with the web 11, and then permanently secured to the web. For bag making, plastic material most appropriate for the mechanical and optical qualities desired, in either or both of the fastener strips and the film, should be chosen. For example, the web 11 may be formed from polypropylene and the fastener strips may be made from polyethylene where the fastener strips and the web are to be adhesively attached to one another. On the other hand, where the fastener strips are to be fused to the web they may both be made from the same material, or at least from materials which are fusibly compatible.

An extrusion of the fastener strips 10 may be by means of one or more, in this instance two, extruders 12 which extrude the fastener strips through suitable die orfices to produce the desired profiled strip section. For convenience and compactness of apparatus, the fastener strips produced by each of the extruders 12 are projected from the extruder in close proximity into and through a chilling device 13 in which the hot plastic extruded fastener strips are subjected to a cooling medium such as water and from which the fastener strips travel continuously toward union with the web 11. In the illustrated example, two of the fastener strips 10 are produced at one side of the web 11 and two of the fastener strips 10 are produced at the opposite side of the web.

Although the web 11 may be supplied from a roll where it may comprise a non-plastic material, or where it may be a composite plastic and non-plastic material and thus desirably prefabricated at a different place and at a different speed than that of the assembly and joining speed of the fastener strips to the web, in a more usual arrangement for producing bag making zipper profile film web, the web 11 is extruded through a suitable elongated orifice from a T-die 14 of an extruder 15. For example, the plastic film web 11 may be a flat sheet of about 60 inches. Since both the fastener strips 10 and the web 11 are prefabricated before joining them and since the fastener strips are extruded and chilled separately from the web 11, production of the fastener strips and the web and joining them can be effected at high speed such as about 650 to 1000 feet per minute (200–300 m/mn), especially where attachment of the fastener strips to the web is effected adhesively.

Means for guiding and applying the fastener strips 10 to the web 11 comprise, for each of the fastener strips 10, an angling guide roller 17 over which the strips are guided from a path which generally parallels the adjacent edge of the web 11 to a direction transversely inwardly relative to said web and to an angling roller 18, over and from which the fastener strip travels onward again longitudinally with the web 11 in the desired orientation for assuming its attached position on the web. The rollers 17 may be rotatably mounted in fixed position by means of brackets 19 (FIG. 2) carried on a machine frame 20.

Mounting of the angling rollers 18 is effected by means permitting adjusting of the fastener strips 10 transversely relative to the web 11 without interrupting the continuous travel of the fastener strips and web. For this purpose, the rollers 18 are mounted on respective adjustment arms 21 extending longitudinally relative to the travel of the web 11, with said arms mounted adjustably on a bar or beam 22 which extends transversely in a suitably spaced relation to the path of travel of the web 11, and is fixedly mounted at its opposite ends such as by means of rigid arms 23 to the frame 20. In one convenient manner of mounting the arms 21, each of them has a rigid slide block 24 on its end opposite the supported roller 18, with the slide block being slidably engaged on the beam 22 so as to permit incremental transverse adjustment with respect to the web 11. To fix the block 24 in each instance releasably in adjusted position along the beam 22, releasable retaining means such as a set screw 25 may be carried by each of the blocks.

The length of each of the arms 21, and its spaced relation to the path of travel of the web 11 is such that an additional mechanism can be carried by the arm and the associated mounting block 24 for handling and attaching the associated fastener strip 10. Desirably a fastener strip guide 27 is carried by the arm 21 for accurately directing the fastener strip convergently toward the web 11. Downstream from the guide 27, means are provided for attaching the the fastener strip 10 to the web 11, and in one desirable form comprising an adhesive applicator 28 having a nozzle 29 from which suitable adhesive 30 is deposited between the interface area of the web 11 and the fastener strip 10 adjacently upstream from where the web and strip converge. Liquid adhesive is supplied to the applicator 28 from any suitable source as by means of a conduit 31. Mounting of the applicator 28 is desirably by means of an auxiliary arm 32 fixed to the block 24 of the associated supporting arm 21. After application of the adhesive 30, a presser roll 33 presses the web sections of the fastener strip 10 firmly against the web 11 which at this point is supported by a backing roll 34 mounted rotatably on the frame 20. Conveniently, the presser roll 33 may be journaled on bearing bracket means 35 also carried by the auxiliary arm 32, with resilient spring biasing means 37 acting on an axle 38 of the roller 33 to thrust the roller yieldably toward the webs of the fastener strip 10. Although each of the arms 21 has a separate presser roll 33 associated therewith, the backing roll 34 is common to the entire array of presser rolls, and desirably extends entirely across the web 11. Through this arrangement, each of the arms 21 and the associated fastener strip guiding and attaching mechanisms are adapted to be incrementally adjusted transversely relative to the web 11, for adjusting the position of the associated fastener strip in longitudinal orientation with the web 11, for any variable bag size desired to be made therefrom while the fastener strips and the web continue travelling uninterruptedly at high speed. It will be understood that any suitable means may be provided downstream from the point of attachment of the fastener strips to the web 11 for maintaining the web and fastener strips in continuous onward travelling motion coordinated with the speed of extrusion of the fastener strips and the web. For some purposes, it may be desirable to wind the fastener carrying web on a roll. On the other hand, the fastener carrying web may go directly to processing apparatus such as bag making apparatus where the web may be slit into a plurality of suitable widths zipper profile film strip sections which are suitably folded into U shapes for forming into bag units. Any such means are represented schematically at 20a (FIG. 2).

As best seen in FIG. 5, each of the fastener strips 10 may be of a width to carry integrally thereon a barbed male fastener profile 39 in spaced parallel relation to a grooved complementary female profile 40. To accommodate the profiles 39 and 40, the presser roll 33 is provided with respective clearance grooves 41 and 42 which also assist in guiding the fastener strips accurately into position on the web 11, utilizing the profiles 39 and 40 as guide means for the strip.

For high speed operation, the adhesive 30 is desirably a hot thermofusible synthetic resin adapted to be applied at a temperature of about 390° to 460° F. (150°-190° c) in a layer of about 0.004 inch (0.10 mm) at a speed up to 1000 ft per minute (300 m/mn), sufficiently tacky to retain the attached fastener strip on the web and to set in about 3 to 5 seconds after being applied.

Where it is preferred to attach the fastener strip to the web by electronic or heat fusion, the arrangement of FIG. 6 may be employed. For this purpose, the guiding and supporing arm 21' may be of substantially the same construction and function similarly as the arm 21 already described, supported on a slide block 24' slidably mounted on the beam 22' to which it is adapted to be locked in adjusted position by means of a set screw 25'. In addition the arm 21' carries the guide 27'. However in this instance, there is mounted on the block 24' in association with the arm 21' an electronic welding roll 43 rotatably carried by a bracket 44 on an auxiliary arm 45 supported by the block 24'. To accommodate the fastener strip profiles, the welding roll 43 is grooved similarly as the roll 33. The roll 43 is suitably electronically or heat powered and presses the web of the fastener strip 10 against the web 11 toward a cooperating backing roll 47 which may be supported by bracket means 48 carried by the machine frame and biased toward the back of the web 11 by means of biasing springs 49 acting against an axle 50 of the roll 47. Through this arrangement, as the fastener strip 10 converges with the web 11 at high speed, the roll 43 permanently electronically or heat welds the strip to the web.

Whether the fastener strips are adhesively, electronically or heat attached permanently to the film web, the reclosable plastic fastener strips may carry fastener profiles arranged for either top opening or bottom opening bags. For top opening bag purposes, the arrangement of fastener strips on the web may be substantially as exemplified in FIG. 3 wherein the web 11' has attached thereto at suitably spaced intervals fastener strips 10' carrying a pair of integral laterally spaced male profiles 39' with such strips 10' alternating with fastener strips 10" having a pair of integral laterally spaced female profiles 40'. In suitably spaced adjacency to the respective opposite longitudinal edges of the sheet web 11' are attached a fastener strip 10a having thereon a female profile 40" and a fastener strip 10b having thereon a single male profile 39". The fastener strips 10', 10", 10a and 10b are so disposed relative to one another that when the web 11' is severed along lines 51 medially between the male and female profile pairs 39' and 40', respectively the resulting zipper profile film sections are adapted to be folded along lines 52 midway between adjacent male and female profiles to bring said male and female profiles into fastened relationship, thereby providing open top bags wherein the portion of the film between the fastener strips is folded to provide the walls of the bag with said bag having a closed bottom and being openable at the top by separating the resiliently flexible zipper fastener. It will be understood, of course, that as is usual practice, the folded film section will be transversely sealed at suitable intervals to provide bag units. It will be observed, of course, that for maximum yield, the web 11' in the illustrated example has been provided with six fastener strips. This shows that there is no necessary limit on the number of fastener strips that may be applied to a travelling film web, within the parameters of practicability and apparatus capacity.

For producing bottom open bags, having reference to FIG. 4, the web 11 having attached thereon the fastener strips 10 each provided with an integral male profile 39 and an integral female profile 40, is adapted to be served along longitudinal lines 53 midway between the fastener strips 10 and folded along longitudinal lines 54 midway between the profiles 39 and 40 of each of the strips to bring the profiles into mating fastener closed relation. Thereby the portions of the zipper profile film sections at each side of the fastener strip 10 in each instance provide wall panels for open bottom bags. It will be understood that after folding of the web film sections, the sections are transversely sealed at suitable intervals and separated into bag units. Such open bottom bag units can then be filled through their open bottoms and the openings sealed to provide bags which are completely hermetically sealed until they are opened for access to the contents by severance, as by snipping the bags open along substantially the fold lines 54, whereby the fasteners of the bag can then be opened by manually separating the fastener profiles 39 and 40. After thus opening the bags, they can be readily reclosed by again joining the fastener profiles 39 and 40.

Although two examples of fastener and film web orientation and bag making potential have been described, it will be apparent that numerous and varied other fastener orientations and arrangements may be attained according to the principles of the present invention. A salient new and improved result attained by the present invention is the capability of varying the width of the zipper profile film, that is the strip sections into which the sheet web is severed, in any desired combination without ever having to stop the continuous running travel of the fastener strips and web. This result is achieved by the facility of incremental transverse adjustment of the positions of the fastener strips on the travelling web as desired without interrupting continuous high speed travelling flow of the fastener strips and the web. Such freedom from interruption in the continuous travelling flow includes the extrusion process.

It will be understood that variations and modifications may be effected without departing from the spirit and scope of the novel concepts of this invention.

I claim:

1. A method of making variable width profile film web whereby a substantially continuous prefabricated resiliently flexible extruded profiled plastic fastener strip is joined to a prefabricated substantially continuous film web, compromising the steps of:

effecting continuous running travel of the web and the fastener strip in the same longitudinal direction and at the same speed;

adjusting the position of the fastener strip transversely relative to the web while the web and the fastener strip are travelling without interruption;

guiding the fastener strip into convergence with the web;

and then permanently securing the travelling fastener strip to the travelling web.

2. A method according to claim 1, comprising adjusting the position of any of a plurality of the fastener strips transversely relative to the web and the other fastener strips while the web and the fastener strips are travelling without interruption, guiding said fastener strips into convergence with the web while effecting continuous running travel of the web and all of the fastener strips in the same longitudinal direction and at the same speed, and permanently securing the travelling fastener strips to the travelling web.

3. A method according to claim 2, comprising extruding the fastener strips in close proximity to one another and at the same production speed, and guiding the fastener strips into spaced joining positions relative to the web.

4. A method according to claim 3, comprising extruding a plurality of the fastener strips adjacent to one longitudinal side of the web and extruding another plurality of the fastener strips adjacent to the opposite longitudinal edge of the web, and guiding the respective pluralities of fastener strips into respective joining positions relative to the web.

5. A method according to claim 4, comprising guiding the fastener strips from the extruder transversely across the travelling web into alignment with the respective joining positions and there diverting the fastener strips to travel longitudinally with the web.

6. A method according to claim 1, comprising applying adhesive between the travelling fastener strip and the travelling web and pressing the fastener strip and the travelling web together with the adhesive therebetween and thereby permanently securing the strip to the web.

7. A method according to claim 1, comprising pressing the fastener strip to the travelling web and fusion bonding the strip to the web, and thereby permanently securing the strip to the web.

8. A method according to claim 1, comprising continuously separately extruding the fastener strip and the film web and without interruption effecting said continuous running travel of the web and the fastener strip in the same longitudinal direction and at the same speed.

9. A method of making zipper profile film web, comprising:

extruding a plurality of separate plastic fastener strips in close proximity to one another and at the same production speed;

effecting continuous running travel of a web of substantial width at the same speed as the extrusion production speed of said fastener strips;

adjusting respective positions of the fastener strips transversely relative to the web and into substantially spaced relation to one another;

then guiding the fastener strips as thus adjusted as to position, and without interruption after extrusion of the strips, into longitudinal positions onto the web;

and permanently securing the travelling fastener strips to the travelling web.

10. A method according to claim 9, comprising extruding the plurality of fastener strips from a plurality of extruders, and guiding the fastener strips from the plurality of extruders into longitudinal positions relative to the web.

11. A method according to claim 10, comprising extruding one plurality of the fastener strips adjacent to one longitudinal edge of the web and another plurality of fastener strips adjacent to the opposite longitudinal edge of the web, guiding the extruded fastener strips transversely across the web into respective longitudinal positions for the fastener strips, and at such longitudinal positions guiding the fastener strips into parallel longitudinal running relation with the web and then effecting permanent securing of the travelling fastener strips to the travelling web.

12. A method according to claim 11, comprising extruding the web as a plastic film web from an extruder separate from the fastener strip extruders and at the same production speed as the extrusion production speed of the fastener extruders.

13. Apparatus for making variable width profile film web by joining a substantially continuous prefabricated resiliently flexible extruded profiled plastic fastener strip to a prefabricated substantially continuous film web, comprising:

means for effecting continuous running travel of the web and the fastener strip in the same longitudinal direction and at the same speed;

means for adjusting the position of the fastener strip transversely relative to the web while the web and the fastener strip are travelling without interruption;

means for guiding the fastener strip into convergence with the web;

and means for permanently securing the travelling fastener strip to the travelling web.

14. Apparatus according to claim 13, wherein said means for effecting continuous running travel of the web effects concurrent continuous running of a plurality of fastener strips in the same longitudinal direction and at the same speed as the web, said means for adjusting being operative to adjust the position of any of the fastener strips transversely relative to the web and to the other fastener strips while the web and the fastener strips are travelling without interruption, said means for guiding acting to guide all of the fastener strips into convergence with the web, and said means for permanently securing being operative to secure all of the travelling fastener strips to the travelling web.

15. Apparatus according to claim 14, comprising means for extruding the fastener strips in close proximity to one another and at the same production speed, and said means for guiding including means operative to guide the fastener strips into spaced joining positions relative to the web.

16. Apparatus according to claim 15, wherein said extruding means comprise a plurality of extruders one of which extrudes a plurality of the fastener strips adjacent to one longitudinal side of the web and the other extruder extruding another plurality of the fastener strips adjacent to the opposite longitudinal edge of the web, and said guiding means being operative to guide the respective pluralities of fastener strips into respective joining positions relative to the web.

17. Apparatus according to claim 16, wherein said guiding means are operative to guide the fastener strips from the extruder transversely across the travelling web into alignment with the respective joining positions and there diverting the fastener strips to travel longitudinally with the web.

18. Apparatus according to claim 13, comprising means for applying adhesive between the travelling fastener strip and the travelling web, and means for pressing the fastener strip and the travelling web together with the adhesive therebetween and thereby permanently securing the strip to the web.

19. Apparatus according to claim 13, comprising means for pressing the fastener strip to the travelling web and for fusion bonding the strip to the web for permanently securing the strip to the web.

20. Apparatus according to claim 13, comprising means for continuously separately extruding the fastener strip and the film web and effecting without interruption said continuous running travel of the web and the fastener strip in the same longitudinal direction and at the same speed.

21. Apparatus for making zipper profile film web, comprising:
means for extruding a plurality of separate plastic strips in close proximity to one another and at the same production speed;
means for effecting continuous running travel of a web of substantial width at the same speed as the extrusion production speed of said fastener strips;
means for guiding the fastener strip from the extrusion means into longitudinal positions relative to the web and in substantially spaced relation of the fastener strips to one another on the web;
means for selectively adjusting said guide means to effect adjustments of the respective positions of the fastener strips transversely relative to the web;
and means permanently securing the travelling fastener strips to the travelling web.

22. Apparatus according to claim 21, comprising a plurality of extruders for extruding the plurality of fastener strips, and said means for guiding being operative to guide the fastener strips from the plurality of extruders into the longitudinal positions relative to the web.

23. Apparatus according to claim 22, wherein one of the extruders operates to extrude one plurality of the fastener strips adjacent to one longitudinal edge of the web and another extruder operates to extrude another plurality of fastener strips adjacent to the opposite longitudinal edge of the web, the guiding means operating to guide the extruded fastener strips transversely across the web into the respective longitudinal positions for the fastener strips, said guiding means also operating at such longitudinal positions to guide the fastener strips into parallel longitudinal running relation with the web, and said means for effecting permanent securing of the travelling fastener strips to the travelling web being operative after the fastener strips have been guided by said guiding means to said parallel running relation to the web.

24. Apparatus according to claim 23, comprising means for extruding the web as a plastic film web from an extruder separate from the fastener strip extruders and at the same production speed as the extrusion production speed of the fastener extruders.

25. A method of making zipper profile film web, comprising:
effecting continuous running travel of a web of substantial width;
extruding one plurality of separate plastic fastener strips adjacent to one longitudinal edge of the web and at a production speed equal to the running travel of the web;
extruding a second plurality of separate plastic fastener strips adjacent to the opposite longitudinal edge of the web and at a production speed equal to the running travel of the web;
guiding the extruded fastener strips transversely across the web into respective longitudinal positions for the fastener strips;
at such longitudinal positions guiding the fastener strips into parallel longitudinal running relation with the web;
adjusting the fastener strips transversely relative to the web and to one another;
and effecting permanent securement of the fastener strips to the travelling web.

26. A method according to claim 25, comprising extruding the web as a plastic film web from an extruder separate from the fastener strip extruders and at the same production speed as the extrusion production speed of the fastener extruders.

27. Apparatus for making zipper profile film web, comprising:
means for effecting continuous running travel of a web of substantial width;
an extruder adjacent to one longitudinal edge of the web and operating to extrude a plurality of separate plastic fastener strips in close proximity to one another and at a production speed equal to the running speed of the web;
a second extruder adjacent to the opposite longitudinal edge of the web and operative to extrude a plurality of separate plastic fastener strips at a production speed equal to the running speed of the web;
guiding means operating to guide the extruded fastener strips transversely across the web into respective longitudinal positions for the fastener strips;
said guiding means also operating at said longitudinal positions to guide the fastener strips into parallel longitudinal running relation with the web;
means for adjusting the guiding means for adjusting the respective positions of the fastener strips transversely relative to the web;
and means for effecting permanent securing of the travelling fastener strips to the travelling web operative after the fastener strips have been guided by said guiding means to said parallel running relation to the web.

28. Apparatus according to claim 27, comprising means for extruding the web as a plastic film web from an extruder separate from the fastener strip extruders and at the same production speed as the extrusion production speed of the fastener extruders.

* * * * *